United States Patent
Tomono

(10) Patent No.: US 9,836,253 B2
(45) Date of Patent: Dec. 5, 2017

(54) IMAGE FORMING APPARATUS CAPABLE OF NOTIFYING USER AT SUITABLE TIMING THAT PRINTING MATERIAL IS RUNNING LOW

(71) Applicant: BROTHER KOGYO KABUSHIKI KAISHA, Nagoya, Aichi (JP)

(72) Inventor: Keitaro Tomono, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/270,194

(22) Filed: Sep. 20, 2016

(65) Prior Publication Data

US 2017/0090830 A1   Mar. 30, 2017

(30) Foreign Application Priority Data

Sep. 30, 2015   (JP) .................................. 2015-194973

(51) Int. Cl.
G06F 3/12   (2006.01)

(52) U.S. Cl.
CPC ............ *G06F 3/1219* (2013.01); *G06F 3/121* (2013.01); *G06F 3/1229* (2013.01); *G06F 3/1235* (2013.01); *G06F 3/1285* (2013.01)

(58) Field of Classification Search
None
See application file for complete search history.

(56) References Cited

U.S. PATENT DOCUMENTS

| 2002/0077979 | A1 | 6/2002 | Nagata | |
|---|---|---|---|---|
| 2009/0112738 | A1* | 4/2009 | Nagata | B41J 2/17559 705/28 |
| 2011/0229157 | A1* | 9/2011 | Kawai | G03G 15/556 399/27 |
| 2015/0158308 | A1* | 6/2015 | Kobayashi | B41J 2/17596 347/85 |

FOREIGN PATENT DOCUMENTS

| JP | 2001239729 A | 9/2001 |
|---|---|---|
| JP | 2002099594 A | 4/2002 |
| JP | 2011197293 A | 10/2011 |

* cited by examiner

*Primary Examiner* — Henok A Shiferaw
(74) *Attorney, Agent, or Firm* — Scully, Scott, Murphy & Presser, P.C.

(57) ABSTRACT

An image forming apparatus includes a connector to which a cartridge containing printing material is connectable and a controller. The controller stores a subscription status indicating whether a user is subscribed to a specific service, acquires first information indicating a residual quantity of the printing material, transmits the first information to a sever, and determines whether the user is subscribed to the specific service. Under the specific service, a new cartridge is delivered by transmitting the first information. When not subscribed to the specific service and the residual quantity is a first threshold value or less, the controller notifies the user that the residual quantity is low. When subscribed to the specific service and the residual quantity is a second threshold value or less, the controller notifies the user that the residual quantity is low. The second threshold value is below the first threshold value.

18 Claims, 8 Drawing Sheets

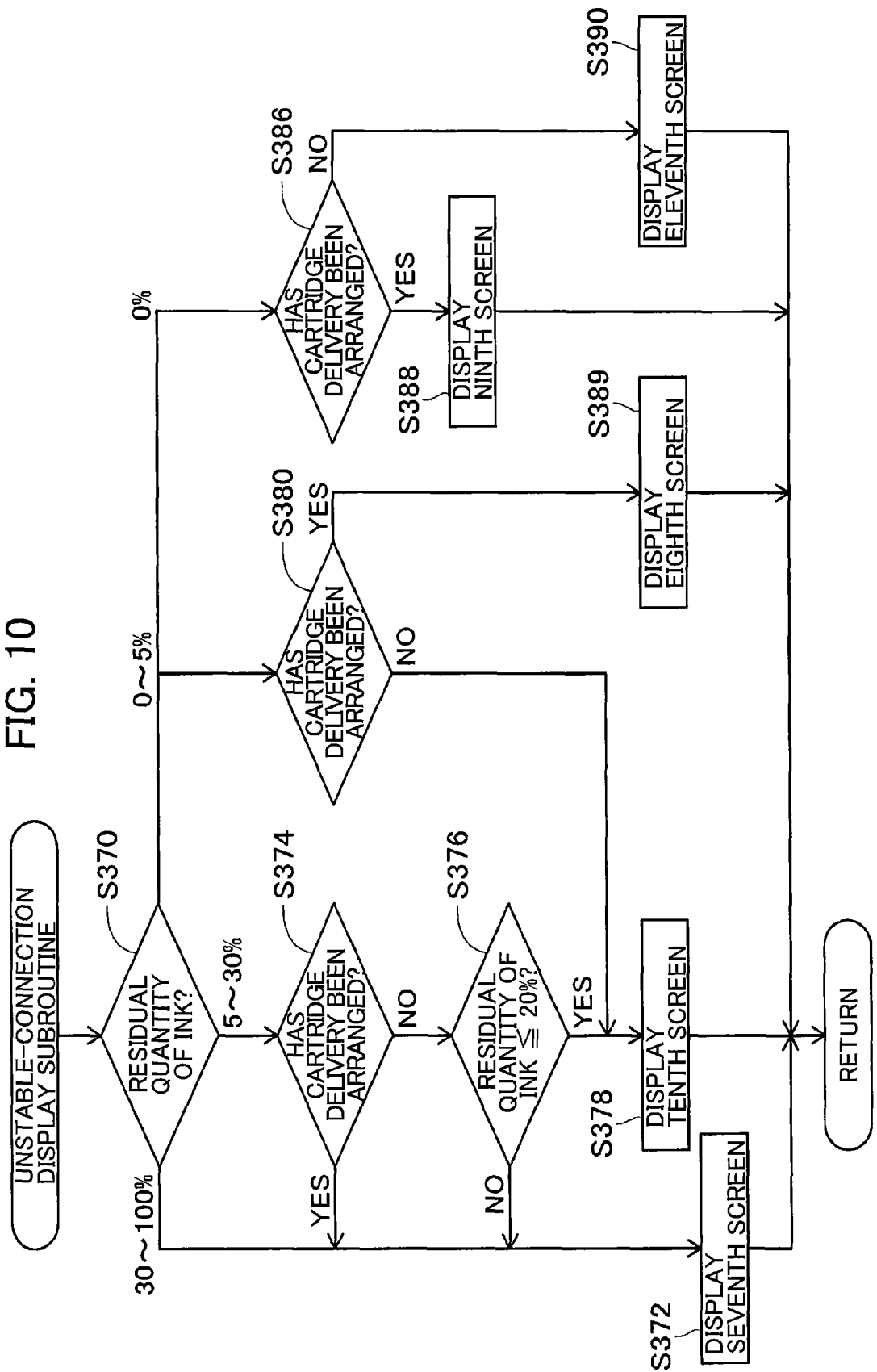

IMAGE FORMING APPARATUS CAPABLE OF NOTIFYING USER AT SUITABLE TIMING THAT PRINTING MATERIAL IS RUNNING LOW

CROSS REFERENCE TO RELATED APPLICATION

This application claims priority from Japanese Patent Application No. 2015-194973 filed Sep. 30, 2015. The entire content of the priority application is incorporated herein by reference.

TECHNICAL FIELD

The present disclosure relates to an image forming apparatus to which cartridges are detachably connectable.

BACKGROUND

Image forming apparatus provided with detachably mounted cartridges are well known in the art. Some such apparatuses inform the user through a message on the display provided in the image-forming apparatus, for example, that a cartridge is running low on printing material when the remaining quantity of printing material in the cartridge has dropped to a prescribed quantity. In recent years, services for the automatic delivery of cartridges have also been proposed.

SUMMARY

It is an object of the disclosure to provide an image forming apparatus capable of notifying the user at a suitable timing that the printing material stored in a cartridge is running low, when the user has subscribed to an automatic delivery service for the delivery of cartridges.

This and other objects will be attained by providing an image forming apparatus including a connector, a print executor, a communication interface, a storage, and a controller. A cartridge containing printing material is connectable to the connector. The print executor is configured to print an image using the printing material contained in the cartridge connected to the connector. The controller is configured to: store in the storage a subscription status indicating whether a user is subscribed to a specific service; acquire first information indicating a residual quantity of the printing material in the cartridge connected to the connector; transmit the first information to a server via the communication interface, a new cartridge being delivered to the user in response to transmitting the first information to the server when the user is subscribed to the specific service; determine whether the user is subscribed to the specific service on the basis of the subscription status stored in the storage; notify the user that the residual quantity is running low when the user is determined to be not subscribed to the specific service and when the residual quantity is less than or equal to a first threshold value; and notify the user that the residual quantity is running low when the user is determined to be subscribed to the specific service and when the residual quantity is less than or equal to a second threshold value that is less than the first threshold value.

According to another aspects, the disclosure provides a non-transitory computer readable storage medium stores a set of program instructions installed on and executed by a computer. The set of program instructions includes: storing a subscription status indicating whether a user of an image forming apparatus is subscribed to a specific service, the image forming apparatus comprising: a connector to which a cartridge containing printing material is connectable; and a print executor configured to print an image using the printing material contained in the cartridge connected to the connector; acquiring first information indicating a residual quantity of the printing material in the cartridge connected to the connector; transmitting the first information to a server, a new cartridge being delivered to the user in response to transmitting the first information to the server when the user is subscribed to the specific service; determining whether the user is subscribed to the specific service on the basis of the stored subscription status; notifying the user that the residual quantity is running low when the user is determined to be not subscribed to the specific service and when the residual quantity is less than or equal to a first threshold value; and notifying the user that the residual quantity is running low when the user is determined to be subscribed to the specific service and when the residual quantity is less than or equal to a second threshold value that is less than the first threshold value.

BRIEF DESCRIPTION OF THE DRAWINGS

The particular features and advantages of the disclosure as well as other objects will become apparent from the following description taken in connection with the accompanying drawings, in which:

FIG. 10 is a flowchart illustrating steps in a unstable-connection display subroutine of the process performed by the printer.

DETAILED DESCRIPTION

Figure 1:
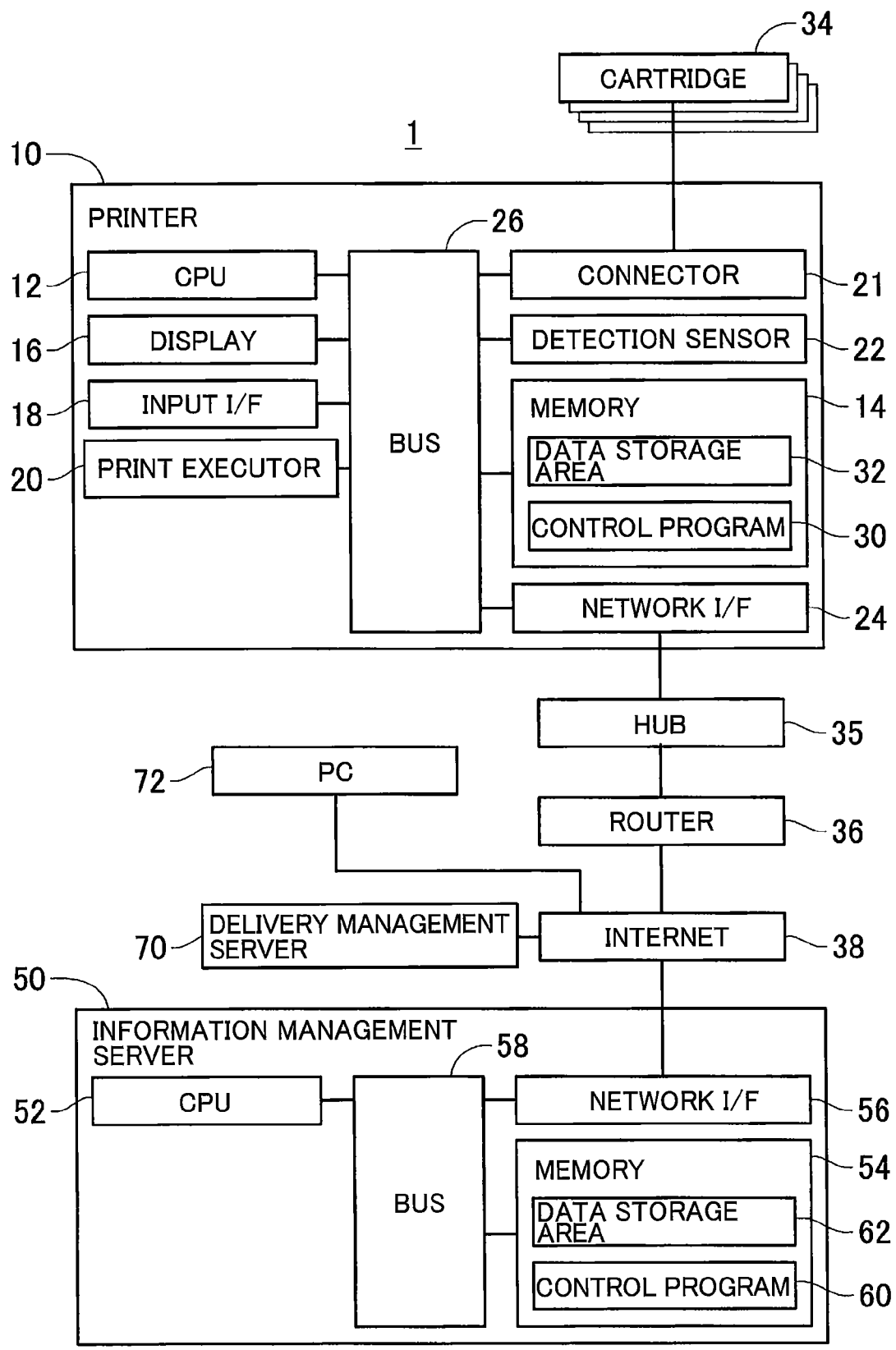
FIG. 1 is a block diagram illustrating a communication system according to one embodiment of the present disclosure.

FIG. 1 is a block diagram showing a communication system 1 according to one embodiment according to the present disclosure. The communication system 1 includes a printer 10, an information management server 50, a delivery management server 70, and a PC 72. The printer 10 is an example of claimed "image forming apparatus." The information management server 50 is an example of claimed "server."

The printer 10 is provided with a CPU 12, a memory 14, a display 16, an input interface 18, a print executor 20, a connector 21, a detection sensor 22, and a network interface 24. All components of the printer 10 can communicate with each other via a bus 26. The CPU 12 is an example of claimed "controller," and is also an example of claimed "computer." The memory 14 is an example of claimed "storage." The network interface 24 is an example of claimed "communication interface."

The CPU 12 executes processes according to a control program 30 stored in the memory 14. The control program 30 is a program for executing a printing process. In the following description, the CPU 12 executing the control program 30 may be simply referred to by the program name. For example, the phrase "the control program 30" may be used to signify "the CPU 12 executing the control program 30." Here, the memory 14 is configured of a combination of storage memory that includes RAM, ROM, flash memory, a HDD, and a buffer provided in the CPU 12, for example. The memory 14 is also provided with a data storage area 32. The data storage area 32 serves to store data and the like required when executing the control program 30.

The display 16 displays various screens based on inputted image data. The display 16 may be configured of, but is not limited to, a liquid crystal display or an organic EL display. The input interface 18 includes keys for instructing the execution of functions possessed by the printer 10. For example, the input interface 18 may be a touchscreen that is integrally configured with the display 16 and that accepts user operations at positions corresponding to icons displayed on the display 16. Alternatively, the input interface 18 may be configured of hardware keys and the like.

The print executor 20 is a printing mechanism, such as an inkjet head. The CPU 12 inputs drive signals into the print executor 20. When configured of an inkjet head, the print executor 20 ejects ink (an example of claimed "printing material") from nozzles in response to the inputted drive signals. That is, the print executor 20 is configured to print an image using ink. Alternatively, the print executor 20 may be configured of an electrophotographic system. In this case, the printing material would be toner.

The connector 21 is formed at the casing of the printer 10. The connector 21 can be connected to a cartridge 34 that contains ink used by the print executor 20. Here, a plurality of the cartridges 34 corresponding to different ink colors can be connected to the connector 21. The detection sensor 22 detects the quantity of ink in each ink color remaining in the corresponding cartridges 34 connected to the connector 21.

The network interface 24 functions to communicate with external apparatuses. The network interface 24 is connected to the Internet 38 via a hub 35 and a router 36. The Internet 38 is connected to the information management server 50 and the delivery management server 70. With this configuration, the printer 10 can perform data communications with the information management server 50 and the like through the network interface 24.

The information management server 50 is provided with a CPU 52, a storage 54, and a network interface 56. These components can communicate with each other via a bus 58.

The CPU 52 executes processes according to a control program 60 stored in the storage 54. The control program 60 functions to manage information related to ink used by the printer 10. In the following description, the CPU 52 executing the control program 60 may be simply referred to by the program name. For example, the phrase "the control program 60" may be used to signify "the CPU 52 executing the control program 60." Here, the storage 54 is configured of a combination of storage memory that includes RAM, ROM, flash memory, a HDD, and a buffer provided in the CPU 52, for example. The storage 54 is also provided with a data storage area 62. The data storage area 62 serves to store data and the like required when executing the control program 60.

The network interface 56 functions to communicate with external apparatuses. The network interface 56 is connected to the delivery management server 70 and PC 72 via the Internet 38. The network interface 56 is also connected to the printer 10 via the router 36 and Internet 38. With this configuration, the information management server 50 can perform data communications with the printer 10, the delivery management server 70, and the PC 72 via the network interface 56.

Fixed-rate printing processes can be performed on the printer 10. Specifically, the manufacturer of the printer 10 offers a fixed-rate printing service that allows the user of the printer 10 to perform printing processes at a fixed cost for a prescribed time period. To subscribe for the fixed-rate printing service, the user enters into an agreement with the manufacturer for each printer. This agreement enables the user to print a preset number of pages at a fixed cost for prescribed time periods during the term of agreement. During the term of agreement, the manufacturer delivers special (exclusive) cartridges to the user. Hereinafter, the fixed-rate printing service is also referred to as "automatic cartridge delivery service." In the embodiment, a fixed-rate printing process is defined as printing using the special cartridges delivered from the manufacturer. The fixed-rate printing service (the automatic cartridge delivery service) is an example of claimed "specific service."

The printer 10 also acquires information related to the quantity of residual ink in each cartridge 34 and transmits this information to the information management server 50. The information management server 50 then manages the residual ink quantities of the cartridges 34 used in the printer 10. When the quantity of ink in the cartridge 34 used in the printer 10 falls below a threshold quantity, the information management server 50 outputs a command to ship a new special cartridge to the user of the printer 10. The information management server 50 outputs these commands without limitation, i.e., any number of times whenever the quantity of ink in a cartridge falls below the threshold quantity. The user can execute printing processes on the printer 10 using the special cartridges until the preset number of pages for a prescribed period has been printed. As an example, if the prescribed period is one month and the preset number of pages is 200, the user can print up to 200 pages within a single month.

However, if the number of pages printed in fixed-rate printing processes performed during the prescribed period exceeds the preset number, the user pays a surcharge in addition to the fixed rate described above. For example, if the agreement for the fixed-rate printing service allows the user to execute printing processes at a fixed rate up to 200 pages per month, a fee corresponding to the number of printed pages over 200 pages (the preset number) is added to the fixed rate. Therefore, each time a fixed-rate printing process is performed, the printer 10 counts the number of pages printed and transmits information for the number of printed pages to the information management server 50. Based on the information received from the printer 10, the information management server 50 manages the number of pages that the printer 10 has printed in fixed-rate printing processes and bills an amount equivalent to this number of printed pages to the user of the printer 10 for each prescribed period. In this way, the information management server 50 keeps track of the quantities of residual ink in cartridges used by the printer 10 and the number of pages printed in fixed-rate printing processes to ensure that special cartridges for fixed-rate printing processes are shipped at an appropriate timing and that an appropriate billing amount is calculated for the fixed-rate printing processes.

In addition to fixed-rate printing processes, the printer 10 is capable of executing normal printing processes. A normal printing process in the first embodiment is a printing process executed using normal cartridges in a state where the normal cartridges are connected to the connector 21 instead of the special cartridges delivered under an agreement for the fixed-rate printing service. the normal cartridges are cartridges included with the printer 10 or sold at retail stores and the like.

Note that the printer 10 has an operating mode for executing normal printing processes (hereinafter called a "first mode"), and a different operating mode for executing fixed-rate printing processes (hereinafter called a "second mode"). In the first mode, the printer 10 is prohibited from executing a printing process when a special cartridge is connected to the connector 21 and can only execute printing processes when normal commercially available cartridges (normal cartridges) are connected to the connector 21. This mode is provided to prevent the execution of unauthorized printing processes. For example, if a user not under contract for the fixed-rate printing service obtains special cartridges illegally, this mode can prevent the user from executing printing processes using these special cartridges. Hence, operations of the printer 10 are controlled according to the first mode during normal printing processes.

On the other hand, in the second mode for executing fixed-rate printing processes, the user is under agreement to pay the fee required for executing such fixed-rate printing processes. Hence, the printer 10 is allowed to perform printing processes when the special cartridges are connected to the connector 21. However, since the user can print only up to the preset number of pages at the fixed rate in the fixed-rate printing service, the printer 10 counts the number of pages printed in each printing process performed while special cartridges are connected to the connector 21.

Further, in the second mode, the printer 10 is allowed to perform printing processes even when normal commercially available cartridges are connected to the connector 21. This reduces the economic burden on the user. That is, a user of the fixed-rate printing service is charged for each printed page that exceeds the preset number of pages during the prescribed period when such printing processes are executed even within the term of agreement. For this reason, the printer 10 is allowed to execute printing processes in the second mode even when the special cartridges have been disconnected from the connector 21 and replaced with normal cartridges. Moreover, when only normal cartridges are connected to the connector 21, the printer 10 does not count the number of pages printed at this time as pages printed in fixed-rate printing processes. In this way, the user can avoid paying surcharges for printing processes executed after exceeding the number of preset pages under the fixed-rate printing service, thereby reducing the user's economic burden.

Next, a fixed-rate printing process executed in the second mode and a normal printing process executed in the first mode will be described while referring to the sequence chart shown in FIG. 2.

First, a user wishing to enter into an agreement for the fixed-rate printing service uses the PC 72 to access the web server of the manufacturer offering the fixed-rate printing service. In the communication system 1 of the present embodiment, the information management server 50 is the web server of the manufacturer offering this fixed-rate printing service. Hence, the user accesses the information management server 50 through the PC 72 and inputs information for an account name, password, address, full name, and the like (hereinafter this information is also referred to as "user information"). The information management server 50 then stores the inputted user information in the data storage area 62 as account data.

Next, the user re-accesses the information management server 50 through the PC 72 using the account name and password. As a result, a registration page (not shown) is displayed on the display of the PC 72. The registration page includes a start button (not shown) for issuing a request (hereinafter referred to as "agreement request") to enter into an agreement for the fixed-rate printing service to the information management server 50. When the user operates the start button, the PC 72 transmits the agreement request to the information management server 50 (M100 in FIG. 2). Note that the PC 72 also transmits printer information to the information management server 50 together with the agreement request. The printer information identifies the printer to be covered under the agreement. Note that, the printer information is inputted to the PC 72 through the registration page by the user.

Upon receiving the agreement request for the fixed-rate printing service, the information management server 50 transmits an order command to the delivery management server 70 for ordering cartridges (M101). The order command includes recipient information. The recipient information is information related to the full name and address of the user included in the account data. As a result of this order command transmitted to the delivery management server 70, special cartridges are shipped to the address of the user identified by the recipient information. Also, after receiving the agreement request for the fixed-rate printing service, the information management server 50 transmits service-initiating information to the printer 10 identified by the printer information that was received together with the agreement request in order to begin the fixed-rate printing service (M102). The service-initiating information indicates that the user of the printer 10 is subscribed to the fixed-rate printing service. Also, the service-initiating information includes instructions to change the operating mode of the printer 10 from the first mode to the second mode. Upon receiving the service-initiating information, the printer 10 changes its operating mode from the first mode to the second mode (M106). The service-initiating information is an example of claimed "second information," and is also an example of claimed "affirmative status."

However, even though the operating mode has been changed to the second mode, the printer 10 cannot execute fixed-rate printing processes unless special cartridges for fixed-rate printing processes have been connected to the connector 21. Therefore, the printer 10 determines whether such special cartridges have been connected to the connector 21 (M108). When special cartridges have been connected to the connector 21, the printer 10 becomes capable of executing fixed-rate printing processes. An agreement status (an example of claimed "subscribed status") for the printer 10 is stored in the data storage area 32. The agreement status indicates whether the printer 10 is capable of executing fixed-rate printing processes, i.e., whether the user of the printer 10 is subscribed to the fixed-rate printing service. In other words, the agreement status indicates whether the printer 10 is covered under the agreement for the fixed-rate printing service. When the printer 10 determines in M108 that special cartridges are connected to the connector 21, the status "subscribed" is stored in the data storage area 32 as the agreement status. The status "subscribed" indicates that the user of the printer 10 is subscribed to the service, i.e., that the printer 10 is covered under the agreement (M109). That is, after receiving the service-initiating information, on the condition that the special cartridges are connected to the connector 21, the printer 10 stores the status "subscribed" in the data storage area 32 as the agreement status.

As described above, in the second mode, the printer 10 detects the quantities of residual ink in the cartridges and counts the number of pages printed in fixed-rate printing processes. In order to transmit information related to the detected residual ink quantities (hereinafter called "ink information") and information related to the number of counted pages (hereinafter called "page number information") to the information management server 50, the printer 10 determines whether communication has been established between the printer 10 and information management server 50 (M110). When communication with the information management server 50 has been established, the printer 10 transmits the ink information and page number information to the information management server 50 as printing information (M111). Note that the printing information includes ink information for each ink color. After receiving the printing information, the information management server 50 transmits a response to the printer 10 indicating that the information was received (M112).

Figure 3:
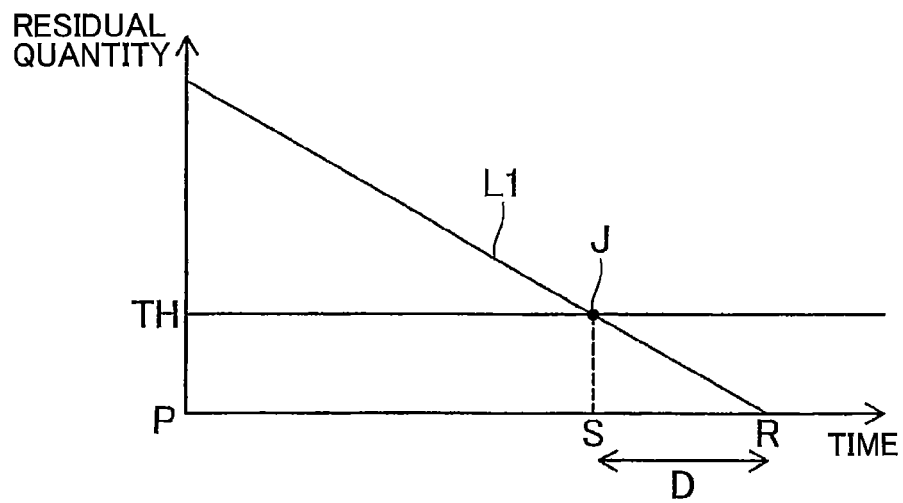
FIG. 3 is a graphical representation illustrating a linear regression line used for calculating usage prediction information.

In addition, upon receiving the printing information, the information management server 50 stores the printing information in the data storage area 32 in association with the time of reception of the printing information. Subsequently, the information management server 50 determines whether a condition for ordering a cartridge has been met based on the ink information included in the printing information and the time of reception associated with the printing information. More specifically, the information management server 50 calculates usage prediction information. The information management server 50 calculates this usage prediction information based on changes over time in the residual quantity of ink indicated by the ink information, as illustrated in FIG. 3. That is, the information management server 50 plots (or records) residual quantities of ink specified in the ink information for each date and time that ink information was received from the printer 10. A linear regression line L1 is calculated as the usage prediction information based on the plurality of plotted (or recorded) points.

The information management server 50 calculates the threshold quantity for determining whether to order cartridges, based on the linear regression line L1 calculated above and the number of days required to deliver the cartridges (hereinafter called the "number of delivery days"). For example, as shown in FIG. 3 the information management server 50 sets the threshold quantity to a residual quantity TH indicated by a point J on the linear regression line L1 corresponding to a date S. The date S precedes the number of delivery days D from a date R on which the ink remaining in a cartridge of the printer 10 is predicted to reach a residual quantity P. The residual quantity P is a quantity determined to be too low for the cartridge to be usable. The information management server 50 then stores the residual quantity TH in the data storage area 32 as the threshold quantity. Note that the threshold quantity is calculated and stored for each ink color.

Figure 2:
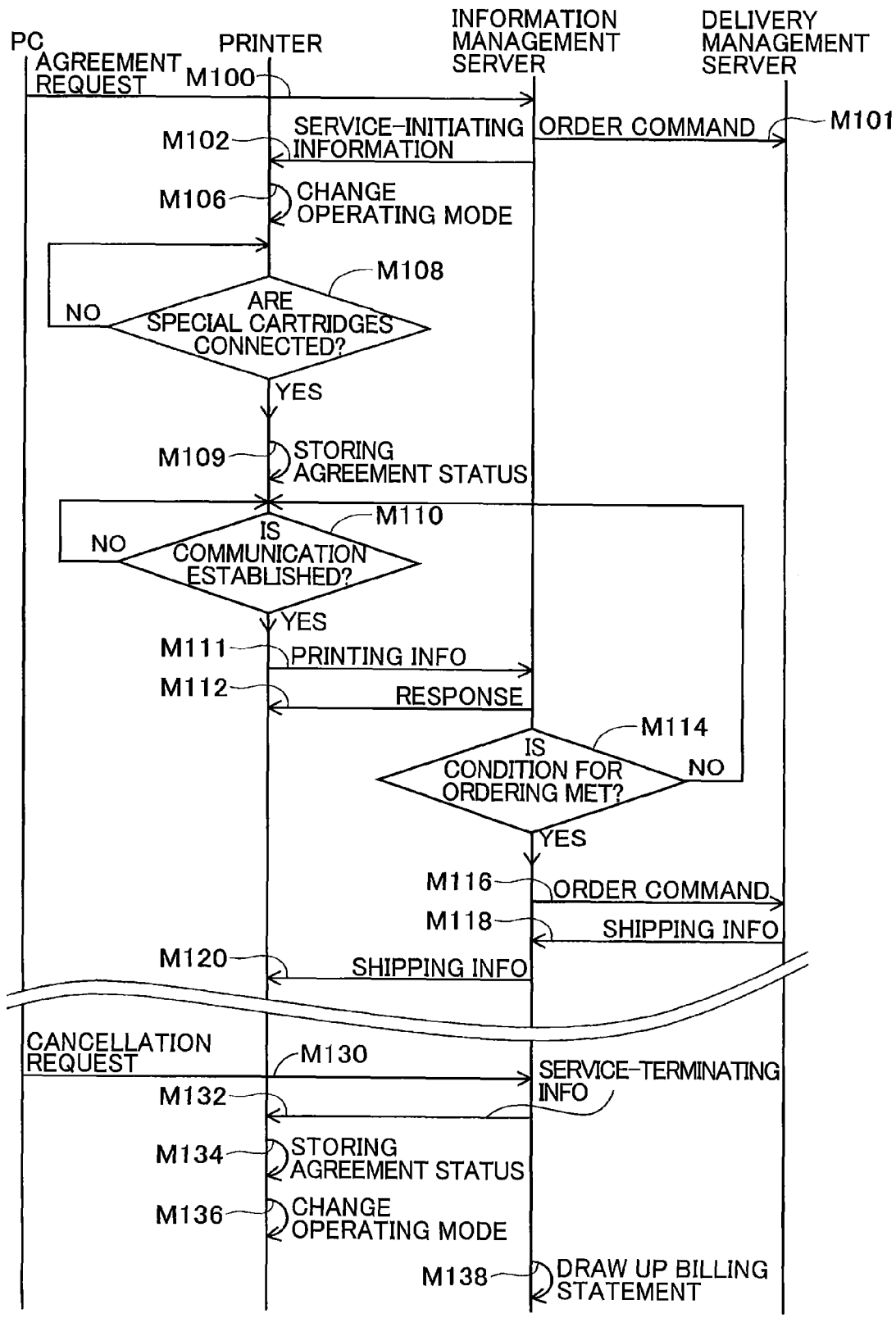
FIG. 2 is a sequence chart illustrating steps for a process performed in the communication system according to the one embodiment.

Thereafter, the information management server 50 determines whether the condition for ordering a cartridge has been met based on the results of analyzing the ink information (M114 in FIG. 2). That is, for each ink color the information management server 50 determines whether the residual quantity of ink specified in the ink information has dropped to the threshold quantity stored in the data storage area 32 or lower. When the residual quantity of ink is found to be greater than the threshold quantity, i.e., when the condition for ordering a cartridge has not been met (M114: NO), the process returns to M110. However, when the residual ink quantity indicated in the ink information has fallen to the threshold quantity or below, i.e., when the condition for ordering a cartridge has been met (M114: YES), the information management server 50 transmits to the delivery management server 70 an order command for ordering a cartridge storing ink of the corresponding ink color in the ink information (M116). Together with the order command, the information management server 50 transmits the model number of the cartridge being ordered and the user information (the recipient information) on the delivery destination, including the user's full name and address, to the delivery management server 70.

Further, after arranging the delivery of the ordered cartridge in response to the order command, the delivery management server 70 transmits information indicating that the shipment has been arranged (hereinafter this information is also referred to as "shipping information") to the information management server 50 (M118). Note that the arrangements for shipping do not require that the delivery articles have been physically shipped off to the delivery destination, but only that instructions for the shipment have been issued to the shipper. The shipping information is an example of claimed "third information."

Upon receiving shipping information from the delivery management server 70, the information management server 50 relays this shipping information to the printer 10 (M120) and the printer 10 receives the shipping information via the network interface 24. The shipping information includes information indicating the color of ink in the cartridge to be shipped. Thus, when the user of the printer 10 has subscribed to the fixed-rate printing service, the information management server 50 manages information on residual quantities of ink in the printer 10 and orders cartridges in time for the cartridges to be shipped to the user of the printer 10 before the printer 10 runs out of ink.

When the user subsequently wishes to cancel the agreement for the fixed-rate printing service, the user accesses the information management server 50 through the PC 72 using the account and password, whereby the registration page is displayed on the display of the PC 72. The registration page includes a Cancel button for canceling the agreement for the fixed-rate printing service. When the user selects the Cancel button, the PC 72 transmits a cancellation request to the information management server 50 to cancel the agreement for the fixed-rate printing service (M130). At this time, the printer information identifying the printer for which the agreement is to be canceled is transmitted to the information management server 50 together with the cancellation request.

Upon receiving the cancellation request, the information management server 50 transmits service-terminating information to the printer 10 identified in the printer information received together with the cancellation request in order to terminate the agreement for the fixed-rate printing service (M132). The service-terminating information indicates that the user of printer 10 is not subscribed to the fixed-rate printing service. Also, the service-terminating information includes instruction to change the operating mode of the printer 10 from the second mode to the first mode. The service-terminating information is an example of claimed "second information," and is also an example of claimed "negative status."

Upon receiving the service-terminating information, the printer 10 stores the status "not subscribed" in the data storage area 32 as the agreement status. The status "not subscribed" indicates that the user of the printer 10 is not subscribed to the fixed-rate printing service, i.e., that the printer 10 is not covered under the agreement for the fixed-rate printing service (M134). Also when the service-terminating information is received, the printer 10 changes its operating mode from the second mode to the first mode (M136). By performing these operations, the printer 10 can no longer execute fixed-rate printing processes, but can only execute normal printing processes according to the first mode. Hence, the printer 10 cannot perform printing processes using the special cartridges for fixed-rate printing, but can only execute printing processes using normal cartridges sold commercially. Also after receiving the cancellation request, the information management server 50 draws up a billing statement for the fixed-rate printing processes (M138).

More specifically, fixed-rate printing is a service in which the printer can print a preset number of pages at a fixed cost in a prescribed period. Accordingly, the information management server 50 calculates the period from the cutoff date of the previous period to the reception time of the most recently received printing information. Next, the information management server 50 determines whether the number of printed pages indicated by the page number information included in the most recently received printing information exceeds the preset number in this period. When the number of pages in the latest printing information does not exceed the preset number, the information management server 50 calculates a billing amount corresponding to the calculated period. However, when the number of printed pages in the latest printing information exceeds the preset number, the information management server 50 calculates a billing amount by adding a fee corresponding to the number of printed pages exceeding the preset number to the cost corresponding to the agreement period for the fixed-rate printing service.

In the communication system 1 described above, when the user of the printer 10 has subscribed for the fixed-rate printing service, i.e., the automatic cartridge delivery service, special cartridges designed for fixed-rate printing processes are shipped automatically to the user when ink in the printer 10 is running low so that the printer 10 can perform printing processes using the special cartridges. However, when the user is not subscribed to the service, the printer 10 executes printing processes using normal cartridges that are sold commercially, for example. Thus, the printer 10 may use either special cartridges or normal cartridges, but the content displayed on the screen to notify the user when ink is running low differs depending on whether the printer 10 is using special cartridges or normal cartridges. This difference is necessary because the special cartridges are automatically delivered when the user is subscribed to the fixed-rate printing service, while the user must purchase normal cartridges at a retail store or the like when not subscribed to the fixed-rate printing service.

More specifically, the printer 10 detects the quantity of remaining ink for each ink color, i.e., for each cartridge 34, at a prescribed timing. If the user of the printer 10 has not subscribed to the fixed-rate printing service (that is, when the agreement status stored in the data storage area 32 indicates the "not subscribed" status), sufficient ink remains when the quantities of residual ink in all cartridges 34 exceed 30%. Therefore, the printer 10 does not display on the display 16 a screen indicating that ink is running low. However, when the residual ink has dropped to 30% (an example of claimed "first threshold value") or less in one or more cartridges 34, the printer 10 displays a first screen on the display 16.

The first screen includes a message indicating that the ink is low in the cartridge whose residual ink quantity is 30% or less and that it is nearly time to replace the cartridge. By reading this message, the user learns that the residual ink quantity in the cartridge 34 of the specified ink color is low and purchases a new cartridge having the same ink color. Since users not subscribed to the fixed-rate printing service must purchase their own cartridges, the printer 10 displays this first screen on the display 16 when the amount of ink remaining in the cartridge 34 is approximately 30% of the cartridge's capacity, i.e., when there is still a certain amount of ink remaining in the cartridge. If the user continues to use ink until the residual quantity of ink in one or more of the cartridges 34 reaches 0%, the printer 10 displays a second screen on the display 16. The second screen includes a message indicating that the cartridge has run out of ink and prompting the user to replace the cartridge.

Note that the printer 10 actually displays the second screen at a timing in which the residual ink quantity falls below X %, rather than when the residual ink quantity reaches 0%, where X % corresponds to the minimum quantity of ink needed to execute a printing process (0.5%, for example). However, to simplify the description, the timing at which the residual ink quantity reaches 0% will be used as the timing at which the printer 10 can no longer print. Further, for simplification in the following description, it will be assumed that only one cartridge 34 (the cyan cartridge) is connected to the connector 21.

Figure 4:
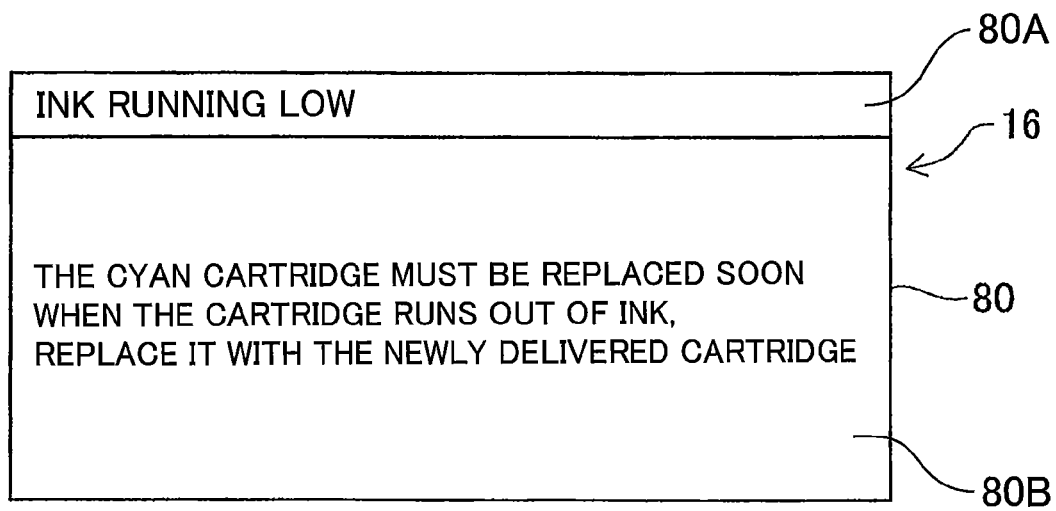
FIG. 4 is an example of a third screen displayed on a display of a printer.

On the other hand, when the user of the printer 10 has subscribed to the fixed-rate printing service (i.e., when the agreement status stored in the data storage area 32 indicates the "subscribed" status), a sufficient amount of ink remains in the cartridge 34 when the residual quantity exceeds 30%. Accordingly, just as when the user is not subscribed to the fixed-rate printing service, the printer 10 does not display a screen on the display 16 indicating that the ink is running low. As the user continues to use ink until the residual ink quantity reaches 30% or less, the printer 10 still does not display a screen on the display 16 indicating that the ink is running low. That is, the printer 10 does not display a screen on the display 16 because a new cartridge for replacement are delivered to users that have subscribed to the fixed-rate printing service before the ink in the cartridge has run out so that the users are not required to purchase the cartridge themselves. Therefore, there is no need to provide unnecessary notifications to the user while a certain amount of ink still remains in the cartridge 34. When the residual ink quantity subsequently drops to 5% (an example of claimed "second threshold value") or less, the printer 10 displays a third screen 80 shown in FIG. 4 on the display 16. As shown in FIG. 4, the third screen 80 includes a title area 80A for displaying the title of the message, and a message area 80B displaying the body of the message. A first title "Ink running low" is included in the title area 80A of the third screen 80, while a first message "The cyan cartridge must be replaced soon" and a second message "When the cartridge runs out of ink, replace it with the newly delivered cartridge" are included in the message area 80B. By reading this message, the user can prepare to replace the old cartridge with the newly delivered cartridge. When the quantity of residual ink drops to 0%, the printer 10 displays a fourth screen on the display 16. As with the third screen 80, the fourth screen also includes a title area and a message area. A second title "Replace cartridge" is provided in the title area of the fourth screen, while a third message "The cyan cartridge is out of ink" and a fourth message "Please replace the old cartridge with the newly delivered cartridge" are arranged in sequence from top to bottom in the message area of the fourth screen. By reading this message, the user replaces the old cartridge that has run out of ink with the newly delivered cartridge. Note that fifth through seventeenth screens described below also possess a title area and a message area similar to those in the third screen 80 and the fourth screen.

However, occasionally the user may print more than the normal printing amount. For example, when the user normally prints only about 10 pages per week but happens to print approximately 50 pages in one day, the actual ink usage will deviate greatly from the linear regression line L1 shown in FIG. 3. Consequently, the residual quantity of ink may drop to 5% or lower before the delivery management server 70 can arrange to ship cartridges. In such cases, the printer 10 displays a fifth screen on the display 16. In the fifth screen, the first title "Ink running low" is arranged in the title area, while the first message "The cyan cartridge must be replaced soon," a fifth message "Cartridge will be delivered soon," and the second message "When the cartridge runs out of ink, replace it with the newly delivered cartridge" are arranged in sequence from top to bottom within the message area.

When the residual ink quantity reaches 0%, the printer 10 displays a sixth screen on the display 16. In the sixth screen, the second title "Replace cartridge" is arranged in the title area, while the third message "The cyan cartridge is out of ink," the fifth message "Cartridge will be delivered soon," and a sixth message "Replace the old cartridge with the new cartridge when it is delivered" in sequence from top to bottom within the message area. Note that the printer 10 determines whether the delivery management server 70 has already shipped the cartridge. Specifically, when the printer 10 received shipping information from the information management server 50 after the cartridge was last replaced, the printer 10 determines that the delivery management server 70 has arranged for shipment of the cartridge. When shipping information was not received from the information management server 50 after the cartridge was last replaced, the printer 10 determines that the delivery management server 70 has not made arrangements to ship the cartridge. Note that, the CPU 12 of the printer 10 detects that the cartridge currently connected to the connector 21 has been replaced with a new cartridge, i.e., a new cartridge has been connected to the connector 21 by receiving signals transmitted from the connector 21.

As described above for the fixed-rate printing processes, the information management server 50 further estimates the timing for ordering a cartridge, i.e., the timing of delivering a new cartridge to the user based on ink information received from the printer 10 and orders the cartridge according to this estimate. In other words, the information management server attempts to estimate the timing of delivering a new cartridge. However, the information management server 50 may not be able to estimate a suitable timing for ordering a cartridge, i.e., a suitable timing of delivering a new cartridge when communication cannot be performed properly between the printer 10 and information management server 50. Accordingly, both the printer 10 and information management server 50 monitor a connection status of the printer 10 and information management server 50, and the printer 10 displays on the display 16 a screen corresponding to this connection status. The timing of delivering a new cartridge is an example of claimed "delivery timing."

More specifically, the printer 10 calculates the probability that the transmission of printing information was not successful each time printing information is transmitted to the information management server 50 (hereinafter referred to as the "transmission failure rate"). That is, when the printer 10 transmits printing information to the information management server 50 (M111 in FIG. 2), the information management server 50 transmits a response to the printer 10 if the printing information is received (M112). Thus, when communication is established between the printer 10 and information management server 50, the printer 10 receives from the information management server 50 a response to the transmission of printing information. However, the printer 10 does not receive from the information management server 50 a response to the transmission of printing information when communication is not established between the printer 10 and information management server 50. Communication may not be established for various reasons, such as the router 36 not being configured correctly, an error occurring on the provider end, the power to the router 36 being off, or the hub 35 not being connected to the router 36.

The printer 10 increments a transmission success counter by one each time a response is received to printing information transmitted to the information management server 50, and increments a transmission failure counter by one each time a response is not received. Subsequently, the printer 10 calculates the transmission failure rate by calculating the ratio of the value stored in the transmission failure counter to the sum of the value stored in the transmission success counter and the value stored in the transmission failure counter between the time of the most recently transmitted printing information to the time that printing information was transmitted a prescribed number of times earlier. When the transmission failure rate calculated above is less than a threshold A (an example of claimed "prescribed value"), the printer 10 determines that the connection status between the printer 10 and information management server 50 is stable and stores the connection status "stable" in the data storage area 32.

When the calculated transmission failure rate is 100%, the printer 10 determines that communication is not possible between the printer 10 and information management server 50 and stores the connection status "no communication" in the data storage area 32. Further, when the calculated transmission failure rate is at least the threshold A but less than 100%, the printer 10 determines that the connection status between the printer 10 and information management server 50 is unstable and stores the connection status "unstable" in the data storage area 32. Clearly the printer 10 cannot communicate with the information management server 50 when the network interface 24 is not connected to the hub 35 or when the network setting in the network configurations on the printer 10 is OFF. Accordingly, in such situations the printer 10 stores the connection status "disconnected" in the data storage area 32 without calculating the transmission failure rate.

As described above, the information management server 50 also determines whether the ordering condition has been met (M114 in FIG. 2) each time the information management server 50 receives printing information from the printer 10 (M111 in FIG. 2). At this time, the information management server 50 calculates the linear regression line L1 based on ink information included in the printing information received from the printer 10. However, when the information management server 50 does not receive ink information a certain number of times cumulatively, the information management server 50 may not be able to calculate a suitable linear regression line L1 and cannot determine whether the ordering condition has been met. The information management server 50 may not be able to receive ink information a sufficient number of times cumulatively when the connection status between the printer 10 and information management server 50 is unstable. Accordingly, when the information management server 50 cannot determine whether the ordering condition has been met, the information management server 50 determines that the connection status between the printer 10 and information management server 50 is unstable and stores this connection status "unstable" in the data storage area 62. On the other hand, when the information management server 50 can determine whether the ordering condition has been met, the information management server 50 determines that the connection status with the printer 10 is stable and stores the connection status "stable" in the data storage area 62. The information management server 50 also transmits connection status information to the printer 10 indicating the connection status stored in the data storage area 62.

Upon receiving connection status information from the information management server 50, the printer 10 determines whether the connection status indicated in this connection status information matches the connection status stored in the data storage area 32. When the connection statuses match, the printer 10 leaves the connection status unchanged in the data storage area 32. However, when the connection statuses do not match, the printer 10 overwrites the connection status stored in the data storage area 32 with the connection status indicated in the connection status information received from the information management server 50.

When the connection status stored in the data storage area 32 is "unstable," "no communication," or "disconnected," the printer 10 displays a screen corresponding to this connection status on the display 16 since it is necessary to stabilize the connection status between the printer 10 and information management server 50. When the connection status stored in the data storage area 32 is "stable," the printer 10 does not display a screen corresponding to the connection status on the display 16 since the connection status is already stabilized. However, the printer 10 displays a screen related to residual ink quantities (the third screen 80 for example) on the display 16 based on the residual ink quantities and shipping information, as described above.

Further, since the printer 10 and information management server 50 cannot communicate properly with each other when the connection status is "unstable," the printer 10 must prompt the user to take action to achieve a stable connection with the information management server 50. To this end, the printer 10 displays a seventh screen on the display 16. In the seventh screen, a third title "Unstable Internet connection" is arranged in the title area, while a seventh message "Your Internet connection is not stable" and an eighth message "You must have a continuous Internet connection in order for the ink delivery service to be effective" are arranged in sequence from top to bottom within the message area. In this way, the user is prompted to take some action in order to stabilize communications between the printer 10 and information management server 50. The eighth message is an example of claimed "fourth information."

Further, when the delivery management server 70 has arranged to ship cartridges, the cartridges will be delivered before the printer 10 runs out of ink, even if the connection status between the printer 10 and information management server 50 is "unstable." Therefore, it is not necessary to notify the user of the printer 10 that the printer 10 is running out of ink when the quantity of residual ink is greater than 5%. Accordingly, the printer 10 displays the seventh screen on the display 16 when the delivery management server 70 has arranged to ship cartridges and the residual quantity of ink is greater than 5%, even when the connection status is "unstable." However, when the delivery management server 70 has arranged to ship cartridges but the residual quantity of ink is 5% or less, the printer 10 displays an eighth screen on the display 16 in order to notify the user that the ink is low. Note that the eighth screen does not merely indicate that ink is low, but also displays the same messages provided in the seventh screen, including the message prompting the user to establish a stable connection with the information management server 50. More specifically, in the eighth screen the first title "Ink running low" is arranged in the title area, while the first message "The cyan cartridge must be replaced soon," the seventh message "Your Internet connection is not stable" and a ninth message "You must have a continuous Internet connection in order to receive future shipments of ink cartridges properly" are arranged in sequence from top to bottom within the message area. The ninth message is an example of claimed "fourth information."

When the residual ink quantity reaches 0%, the printer 10 displays a ninth screen on the display 16. The ninth screen includes a message prompting the user to replace the cartridge that has run out of ink, but also displays the same messages as in the seventh screen, including the message prompting the user to establish a stable connection with the information management server 50. More specifically, in the ninth screen the second title "Replace cartridge" is arranged in the title area, while the third message "The cyan cartridge is out of ink," the fourth message "Please replace the old cartridge with the newly delivered cartridge," the seventh message "Your Internet connection is not stable," and the ninth message "You must have a continuous Internet connection in order to receive future shipments of ink cartridges properly" are arranged in sequence from top to bottom within the message area.

When the delivery management server 70 has not arranged to ship the cartridge while the connected status is "unstable," it is possible that the cartridge will not be delivered to the user despite the user's cartridge being low on ink. For this reason, the printer 10 displays a screen on the display 16 in such cases indicating that the cartridge is low on ink and prompting the user to establish a stable connection with the information management server 50. That is, the printer 10 displays a tenth screen on the display 16 when the delivery management server 70 has not arranged for the delivery of a cartridge and the residual ink quantity is 20% (an example of claimed "third threshold value") or less.

The tenth screen not only indicates that a cartridge is running low on ink, but also includes a message prompting the user to establish a stable connection with the information management server 50 and a message indicating that the shipment of a cartridge has not been arranged due to an unstable connection with the information management server 50. Specifically, in the tenth screen the first title "Ink running low" is arranged in the title area, while the first message "The cyan cartridge must be replaced soon," a tenth message "Cartridges cannot be shipped due to an unstable connection with the Internet," and the eighth message "You must have a continuous Internet connection in order for the ink delivery service to be effective" are arranged in sequence from top to bottom within the message area. In this way, the printer 10 can notify the user that ink is low and can advise the user to establish a stable connection with the information management server 50. This notification and advice are issued earlier than the notification issued when the shipment of a cartridge has been arranged.

When the residual ink quantity reaches 0%, the printer 10 displays a eleventh screen on the display 16. The eleventh screen includes a message indicating that the cartridge is out of ink, but also displays the same messages as in the tenth screen, including the message prompting the user to establish a stable connection with the information management server 50 and the message indicating that the shipment of a cartridge has not been arranged due to an unstable connection with the information management server 50. More specifically, in the eleventh screen the second title "Replace cartridge" is arranged in the title area, while the third message "The cyan cartridge is out of ink," the tenth message "Cartridges cannot be shipped due to an unstable connection with the Internet," the seventh message "Your Internet connection is not stable," and the ninth message "You must have a continuous Internet connection in order to receive future shipments of ink cartridges properly" are arranged in sequence from top to bottom within the message area.

Further, since communication is not possible between the printer 10 and information management server 50 when the connection status is "no communication," the printer 10 must prompt the user to establish Internet communications with the information management server 50. To this end, the printer 10 displays a twelfth screen on the display 16. The twelfth screen includes a message indicating that the printer 10 cannot communicate with the information management server 50 and the reason that communication is not possible, i.e., the reason that the printer 10 is not connected to the Internet, that is, the reason that the transmission of the ink information (the printing information) to the management server 50 is failed. More specifically, in the twelfth screen a fourth title "Internet connection error" is arranged in the title area, while an eleventh message "The printer is not connected to the Internet," and the eighth message "You must have a continuous Internet connection in order for the ink delivery service to be effective" are arranged in sequence from top to bottom within the message area. After reading this message, the user establishes Internet communications with the information management server 50, enabling the printer 10 and information management server 50 to communicate with each other. The eleventh message is an example of claimed "fifth information."

Further, since the information management server 50 cannot determine whether the ordering condition for a cartridge has been met when the connection status is "no communication," the information management server 50 does not automatically order cartridges for the user of the printer 10. Therefore, the printer 10 must notify the user that ink is running low while there is still a certain amount of ink remaining. Accordingly, when the connection status is "no communication" and the residual ink quantity is 30% or less, the printer 10 displays a thirteenth screen on the display 16. The thirteenth screen includes messages indicating that ink is low and that it is nearly time to replace the cartridge. In other words, when the connection status is "no communication," the printer 10 notifies the user that ink is running low at the same timing that the printer 10 notifies users who are not subscribed to the automatic cartridge delivery service i.e., the fixed-rate printing service.

The thirteenth screen further includes a message prompting the user to establish an Internet connection with the information management server 50 and a message indicating that delivery of the cartridge was not arranged because an Internet connection with the information management server 50 is not established. More specifically, in the thirteenth screen the first title "Ink running low" is arranged in the title area, while the first message "The cyan cartridge must be replaced soon," a twelfth message "Cartridges cannot be shipped while the printer is not connected to the Internet," and the eighth message "You must have a continuous Internet connection in order for the ink delivery service to be effective" are arranged in sequence from top to bottom within the message area. In this way, the printer 10 can notify the user that ink is low and can advise the user to establish an Internet connection with the information management server 50 while there is still some ink remaining, making it possible for the user to establish an Internet connection so that an ink cartridge can be delivered before the ink runs out. The twelfth message is an example of claimed "fifth information."

When the residual ink quantity reaches 0%, the printer 10 displays a fourteenth screen on the display 16. The fourteenth screen includes a message indicating that the ink has run out, in addition to the same messages displayed in the thirteenth screen, including the message prompting the user to establish an Internet connection with the information management server 50 and the message indicating that the shipment of cartridges cannot be arranged since an Internet connection with the information management server 50 is not established. More specifically, in the fourteenth screen the second title "Replace cartridge" is arranged in the title area, while the third message "The cyan cartridge is out of ink," the twelfth message "Cartridges cannot be shipped while the printer is not connected to the Internet," and the eighth message "You must have a continuous Internet connection in order for the ink delivery service to be effective" are arranged in sequence from top to bottom within the message area.

When the connection status is "disconnected," the network interface 24 is not connected to the router 36, preventing communication between the printer 10 and information management server 50. Therefore, the printer 10 displays a fifteenth screen on the display 16. The fifteenth screen includes a message indicating that the printer 10 cannot communicate with the information management server 50 and the reason that communication is not possible. In other words, the fifteenth screen includes a message indicating that the printer 10 is not connected to the network, i.e., that the network interface 24 is not connected to the router 36. More specifically, in the fifteenth screen a fifth title "Network connection error" is arranged in the title area, while a thirteenth message "The printer is not connected to the network," and the eighth message "You must have a continuous Internet connection in order for the ink delivery service to be effective" are arranged in sequence from top to bottom within the message area. By reading this message, the user can connect the network interface 24 to the router 36 to establish communications between the printer 10 and information management server 50. The thirteenth message is an example of claimed "fifth information."

Further, when the connection status is "disconnected," the information management server 50 cannot determine whether the ordering condition for cartridges has been met and, therefore, cannot automatically order cartridges for the user of the printer 10. Accordingly, the printer 10 must notify the user that ink is running low while there is still a certain amount of ink remaining. Therefore, when the residual ink quantity is 30% or less while the connection status is "disconnected," the printer 10 displays a sixteenth screen on the display 16. The sixteenth screen includes a message indicating that ink is low and that it is nearly time to replace the cartridge. That is, when the connection status is "disconnected," the printer 10 notifies the user that ink is running low at the same timing that the printer 10 notifies users who are not subscribed to the automatic cartridge delivery service i.e., the fixed-rate printing service.

The sixteenth screen also includes a message prompting the user to connect the printer 10 to the network and a message indicating that the delivery of cartridges has not been arranged since the printer 10 is not connected to the network. More specifically, in the sixteenth screen the first title "Ink running low" is arranged in the title area, while the first message "The cyan cartridge must be replaced soon," the thirteenth message "The printer is not connected to the network," the twelfth message "Cartridges cannot be shipped while the printer is not connected to the Internet," and the eighth message "You must have a continuous Internet connection in order for the ink delivery service to be effective" are arranged in sequence from top to bottom within the message area. In this way, the printer 10 can notify the user that ink is low and can advise the user to establish a network connection while there is still a certain amount of ink remaining, and the user can connect the printer 10 to the network so that cartridges can be delivered before the ink runs out.

When the residual ink quantity drops to 0%, the printer 10 displays a seventeenth screen on the display 16. The seventeenth screen includes a message indicating that the cartridge is out of ink, in addition to the same messages displayed in the sixteenth screen, including the message prompting the user to connect the printer 10 to the network and the message indicating that the delivery of cartridges has not been arranged since the printer 10 is not connected to the network. More specifically, in the seventeenth screen the second title "Replace cartridge" is arranged in the title area, while the third message "The cyan cartridge is out of ink," the thirteenth message "The printer is not connected to the network," the twelfth message "Cartridges cannot be shipped while the printer is not connected to the Internet," and the eighth message "You must have a continuous Internet connection in order for the ink delivery service to be effective" are arranged in sequence from top to bottom within the message area.

Figure 5:
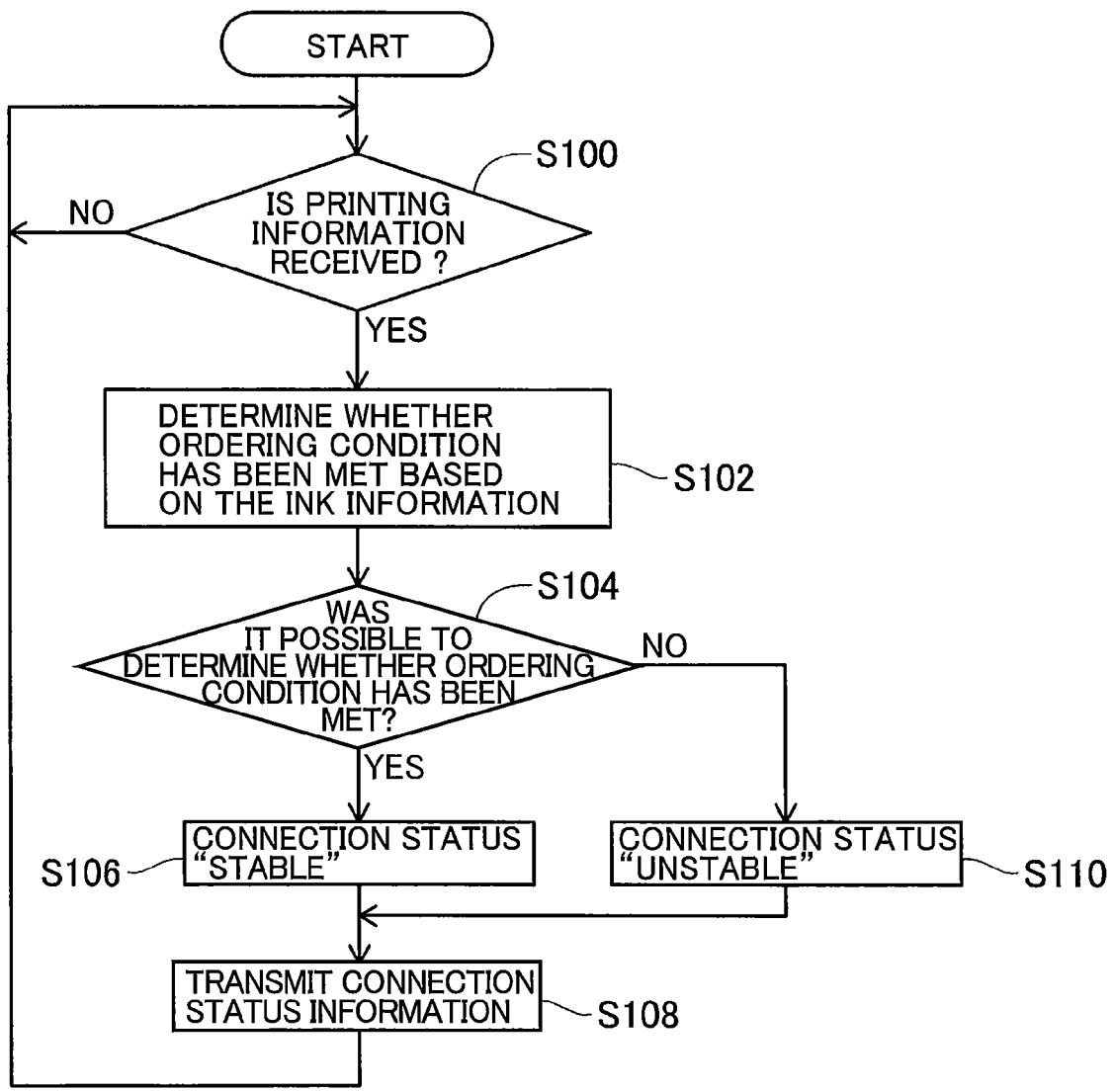
FIG. 5 is a flowchart illustrating steps in a process performed by an information management server.

As described above, the information management server 50 also determines its connection status with the printer 10. Here, the CPU 52 of the information management server 50 makes this determination by executing the control program 60. Next, steps in the process implemented by executing the control program 60 will be described with reference to FIG. 5.

When the control program 60 is executed, in S100 the CPU 52 first determines whether printing information was received from the printer 10. When printing information has not been received (S100: NO), the CPU 52 repeats the determination in S100. However, when printing information has been received (S100: YES), in S102 the CPU 52 determines whether the ordering condition for cartridges has been met based on the ink information included in the printing information. In S104 the CPU 52 determines whether it was possible to determine whether the ordering condition has been met. When it was possible to determine whether the ordering condition has been met (S104: Yes), in S106 the CPU 52 stores the connection status "stable" in the data storage area 62 and advances to S108.

On the other hand, when the CPU 52 was not able to determine whether the ordering condition has been met (S104: No), in S110 the CPU 52 stores the connection status "unstable" in the data storage area 62 and advances to S108. In S108 the CPU 52 transmits connection status information corresponding to the connection status stored in the data storage area 62 to the printer 10 and subsequently returns to S100. The connection status information corresponding to the connection status "unstable" is an example of claimed "sixth information."

Further, processes described above that are performed on the printer 10 to determine the connection status of the printer 10 and to display screens on the display 16 are implemented by the CPU 12 of the printer 10 executing the control program 30. When the CPU 12 executes the control program 30, steps in the process shown in FIG. 6 and steps in the process shown in FIGS. 7 through 10 are repeatedly and concurrently performed. Next, the steps in these processes will be described with reference to FIG. 6 through 10.

Figure 6:
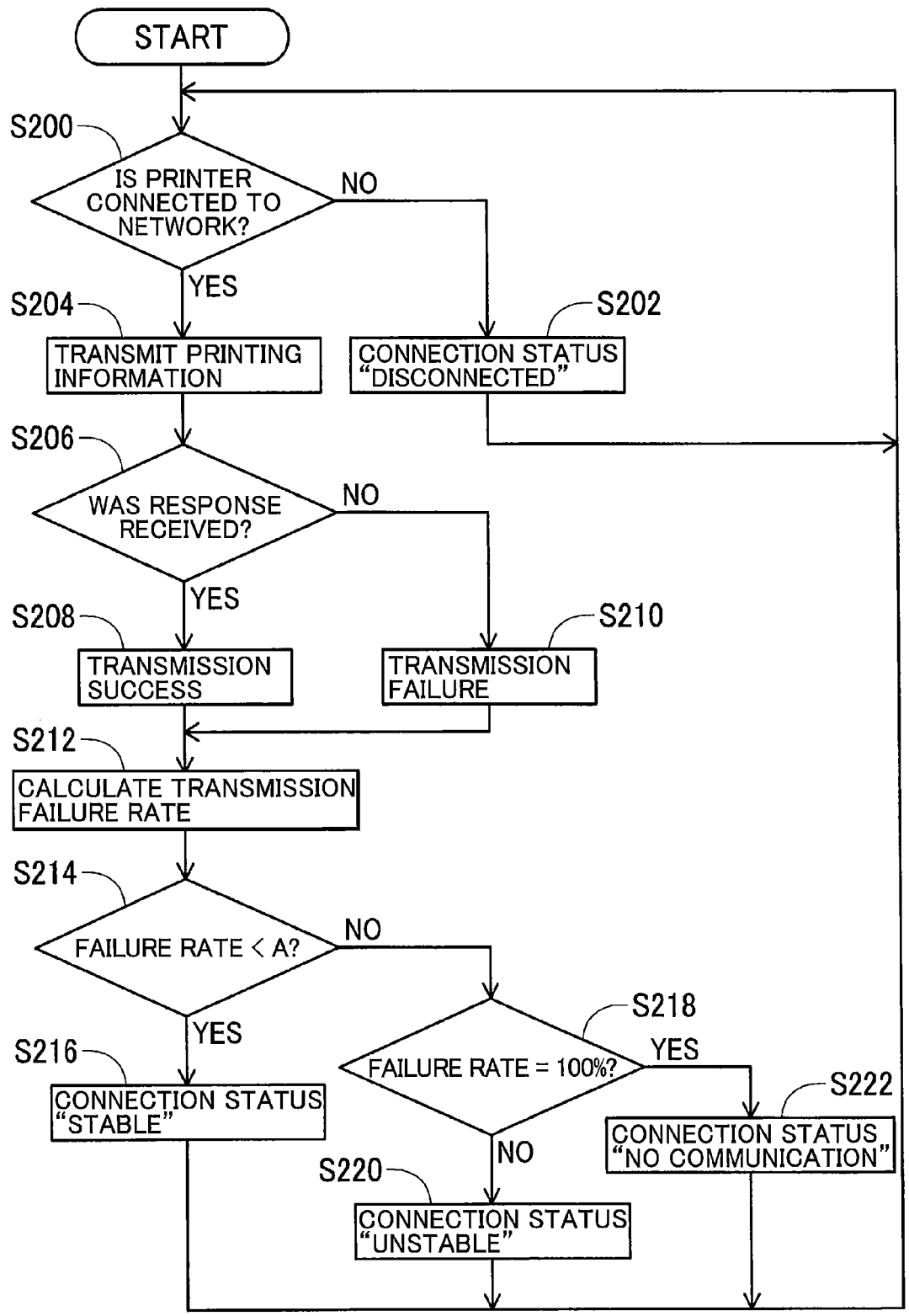
FIG. 6 is a flowchart illustrating steps in a process performed by the printer for determining a connection status.

In S200 of the flowchart shown in FIG. 6, the CPU 12 first determines whether the printer 10 is connected to the network, i.e., whether the network interface 24 is connected to the router 36. when the printer 10 is not connected to the network (S200: NO), in S202 the CPU 12 stores the connection status "disconnected" in the data storage area 32. Subsequently, the process returns to S200. However, when the printer 10 is connected to the network (S200: YES), in S204 the CPU 12 transmits printing information to the information management server 50.

In S206 the CPU 12 determines whether a response to the printing information transmitted in S204 was received from the information management server 50. when a response was received from the information management server 50 (S206: YES), the CPU 12 determines that the transmission was successful and in S208 increments the value of the transmission success counter by one. Subsequently, the process advances to S212. However, when a response was not received from the information management server 50 (S206: NO), the CPU 12 determines that the transmission failed and in S210 increments the value of the transmission failure counter by one. The process subsequently advances to S212.

In S212 the CPU 12 calculates the transmission failure rate based on the transmission success counter and the transmission failure counter. In S214 the CPU 12 determines whether the transmission failure rate calculated in S212 is less than the threshold A. When the transmission failure rate is less than the threshold A (S214: YES), in S216 the CPU 12 stores the connection status "stable" in the data storage area 32, and subsequently returns to S200.

However, when the transmission failure rate is equal to or greater than the threshold A (S214: NO), in S218 the CPU 12 determines whether the transmission failure rate is 100%. When the transmission failure rate is not 100% (S218: NO), in S220 the CPU 12 stores the connection status "unstable" in the data storage area 32, and subsequently returns to S200. When the transmission failure rate is 100% (S218: YES), in S222 the CPU 12 stores the connection status "no communication" in the data storage area 32, and subsequently returns to S200.

In the meantime, in S300 of the flowcharts shown in FIGS. 7 through 10, the CPU 12 detects the residual quantity of ink. In other words, the CPU 12 acquires ink information from the detection sensor 22. Note that, CPU 12 may calculate ink information on the basis of the number of printing times. Alternatively, CPU 12 may calculate ink information on the basis of ink quantity consumed at the time of printing. In S302 the CPU 12 acquires the agreement status stored in the data storage area 32. In S304 the CPU 12 determines, based on the agreement status, whether the user of the printer 10 has been subscribed to the automatic cartridge delivery service. When the user is not subscribed to the automatic cartridge delivery service (S304: NO), in S306 the CPU 12 executes a normal display subroutine. The ink information is an example of claimed "first information."

Figure 7:
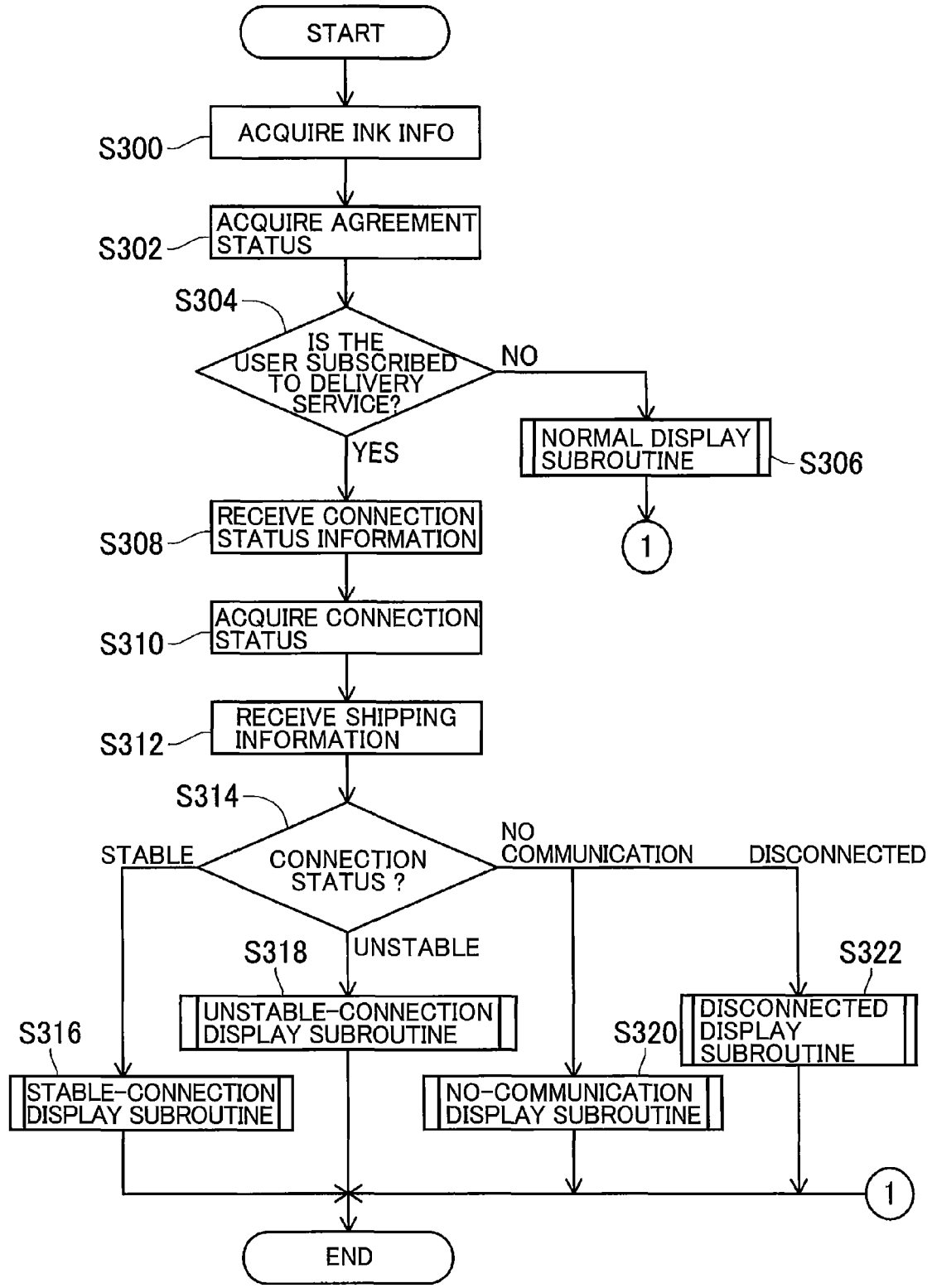
FIG. 7 is a flowchart illustrating steps in a main routine of a process performed by the printer for displaying a screen on a display.
Figure 8:
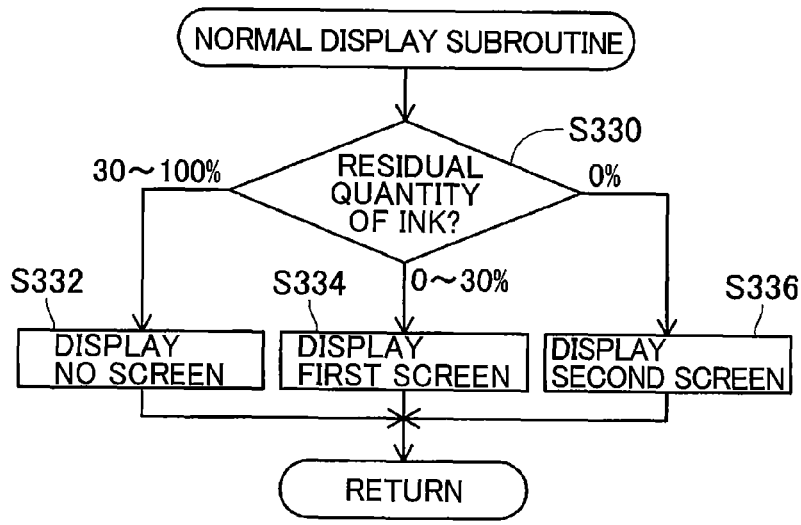
FIG. 8 is a flowchart illustrating steps in a normal display subroutine of the process performed by the printer.

In the normal display subroutine shown in FIG. 8, in S330 the CPU 12 determines the percentage of residual ink specified by the ink information. When the residual ink quantity is greater than 30% and less than or equal to 100%, in S332 the CPU 12 does not display on the display 16 a screen or the like indicating that ink is running low. Subsequently, the CPU 12 ends the normal display subroutine. When the residual ink quantity is greater than 0% and less than or equal to 30%, in S334 the CPU 12 displays the first screen on the display 16, and subsequently ends the normal display subroutine. Further, when the residual ink quantity is 0%, in S336 the CPU 12 displays the second screen on the display 16, and subsequently ends the normal display subroutine. After ending the normal display subroutine, the CPU 12 returns to the main routine of FIG. 7 and the process of FIG. 7 ends.

Returning to the description of S304 in the main routine of FIG. 7, when the CPU 12 determines that the user is subscribed to the automatic cartridge delivery service (S304: YES), in S308 the CPU 12 receives connection status information from the information management server 50. When the connection status indicated in this connection status information differs from the connection status stored in the data storage area 32, the CPU 12 overwrites the connection status stored in the data storage area 32 with the connection status indicated by the connection status information. In S310 the CPU 12 acquires the connection status stored in the data storage area 32. In S312 the CPU 12 receives shipping information when shipping information is transmitted from the information management server 50. In S314 the CPU 12 determines whether the connection status acquired in S310 is "stable," "unstable," "no communication," or "disconnected."

When the connection status is "stable," in S316 the CPU 12 executes a stable-connection display subroutine. In the stable-connection display subroutine shown in FIG. 9, in S350 the CPU 12 determines the percentage of residual ink indicated by the ink information. When the residual ink quantity is greater than 5% and less than or equal to 100%, in S352 the CPU 12 does not display on the display 16 any screen or the like indicating that ink is running low. Subsequently, the CPU 12 ends the stable-connection display subroutine.

When the residual ink quantity determined in S350 is greater than 0% and less than or equal to 5%, in S354 the CPU 12 determines whether the delivery of an ink cartridge has been arranged based on the shipping information. When cartridge delivery has been arranged (S354: YES), in S356 the CPU 12 displays the third screen shown in FIG. 4 on the display 16, and subsequently ends the stable-connection display subroutine. However, when cartridge delivery has not been arranged (S354: NO), in S358 the CPU 12 displays the fifth screen on the display 16, and subsequently ends the stable-connection display subroutine.

When the residual ink quantity in S350 is 0%, in S360 the CPU 12 determines whether cartridge delivery has been arranged based on the shipping information. When cartridge delivery has been arranged (S360: YES), in S362 the CPU 12 displays the fourth screen on the display 16, and subsequently ends the stable-connection display subroutine. However, when cartridge delivery has not been arranged (S360: NO), in S364 the CPU 12 displays the sixth screen on the display 16, and subsequently ends the stable-connection display subroutine. After ending the stable-connection display subroutine, the CPU 12 returns to the main routine of FIG. 7 and ends the process in FIG. 7.

Returning to the description of S314 in the main routine of FIG. 7, when the connection status is "unstable" in S314, the CPU 12 executes an unstable-connection display subroutine in S318. In the unstable-connection display subroutine shown in FIG. 10, in S370 the CPU 12 determines the percentage of residual ink indicated by the ink information. When the residual ink quantity is greater than 30% and less than or equal to 100%, in S372 the CPU 12 displays the seventh screen on the display 16. Subsequently, the CPU 12 ends the unstable-connection display subroutine.

When the residual ink quantity in S370 is greater than 5% but less than or equal to 30%, in S374 the CPU 12 determines whether cartridge delivery has been arranged based on the shipping information. When arrangements for delivering a cartridge have been made (S374: YES), the CPU 12 executes the process from S372 described above. However, when cartridge delivery has not been arranged (S374: NO), in S376 the CPU 12 determines whether the residual ink quantity is less than or equal to 20%. When the residual ink quantity is greater than 20% (S376: NO), the CPU 12 executes the process from S372 described above. However, when the residual ink quantity is less than or equal to 20% (S376: YES), in S378 the CPU 12 displays the tenth screen on the display 16, and subsequently ends the unstable-connection display subroutine.

Figure 9:
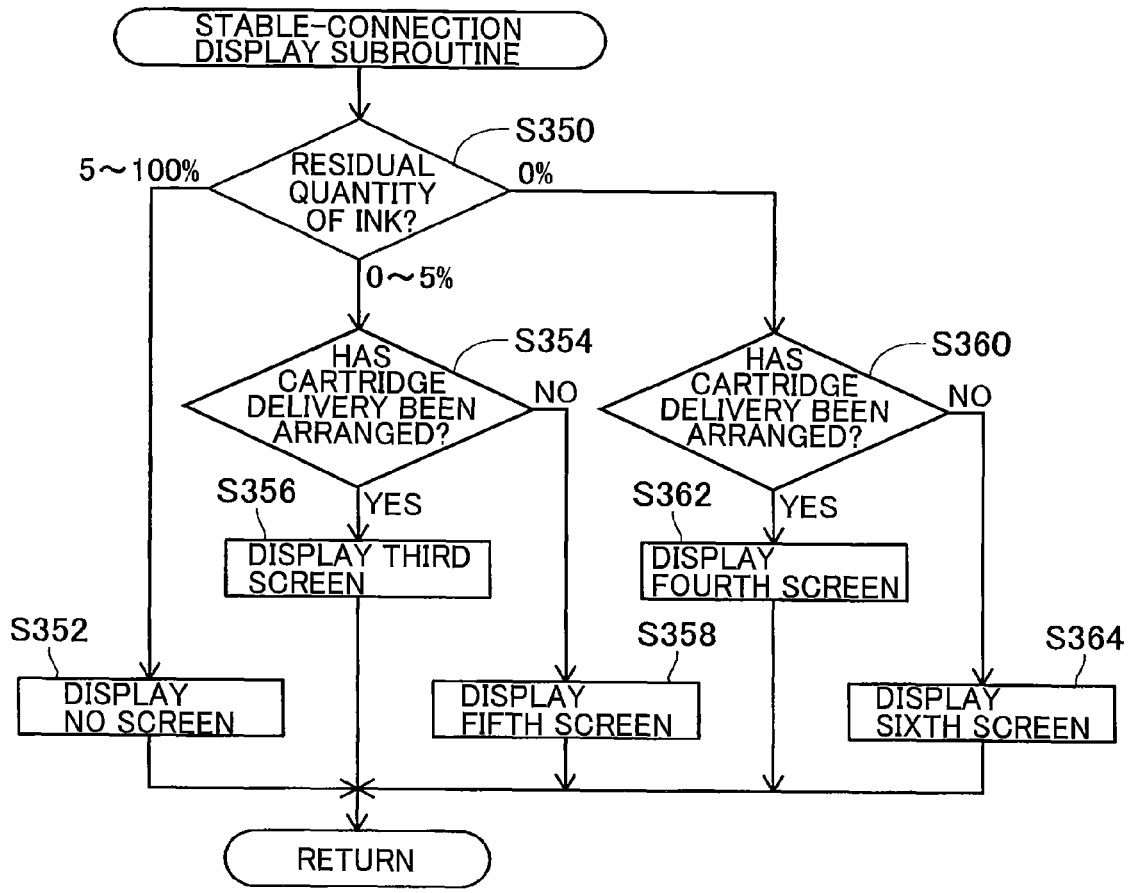
FIG. 9 is a flowchart illustrating steps in a stable-connection display subroutine of the process performed by the printer.

When the residual ink quantity in S370 is less than or equal to 5%, the CPU 12 executes the processes in S380, S378, S389, S386, S388, and S390, which are substantially equivalent to S354-S364 shown in FIG. 9 executed when the CPU 12 determines in S350 of the stable-connection display subroutine that the residual ink quantity is less than or equal to 5%. However, in the unstable-connection display subroutine, in S389 the CPU 12 displays the eighth screen on the display 16 rather than the third screen displayed in S356; in S378 displays the tenth screen rather than the fifth screen displayed in S358; in S388 displays the ninth screen rather than the fourth screen displayed in S362; and in S390 displays the eleventh screen rather than the sixth screen displayed in S364. Subsequently, the CPU 12 ends the unstable-connection display subroutine. After ending the unstable-connection display subroutine, the CPU 12 returns to the main routine in FIG. 7 and ends the process of FIG. 7.

Returning to the description of S314 in the main routine of FIG. 7, when the connection status is "no communication" in S314, the CPU 12 executes a no-communication display subroutine in S320. The process performed in the no-communication display subroutine is essentially similar to the normal display subroutine. However, in the no-communication display subroutine, the CPU 12 displays the twelfth screen on the display 16 rather than not displaying a screen, as in the process of S332; displays the thirteenth screen in place of the first screen displayed in S334; and displays the fourteenth screen in place of the second screen displayed in S336. Subsequently, the CPU 12 ends the no-communication display subroutine. Upon ending this subroutine, the CPU 12 returns to the main routine of FIG. 7 and ends the process of FIG. 7.

Returning to S314 in the main routine of FIG. 7, when the connection status is "disconnected," the CPU 12 executes a disconnected display subroutine. The process performed in the disconnected display subroutine is essentially the same as that in the normal display subroutine. However, in the disconnected display subroutine the CPU 12 displays the fifteenth screen on the display 16 rather than not displaying a screen, as in the process of S332; displays the sixteenth screen in place of the first screen displayed in S334; and displays the seventeenth screen in place of the second screen displayed in S336. Subsequently, the CPU 12 ends the disconnected display subroutine, returns to the main routine in FIG. 7, and ends the process of FIG. 7.

In the present embodiment, the printer 10 (or the control program 30) notifies users not subscribed to the automatic cartridge delivery service i.e., the fixed-rate printing service that the remaining quantity of the ink stored in the cartridge 34 is running low when the remaining quantity of the ink has fallen below 30% or less, and notifies users subscribed to the automatic cartridge delivery service that the remaining quantity of the ink is running low when the remaining quantity of the ink has fallen below 5%. Thus, the printer 10 (or the control program 30) can, at a suitable timing, notifies users who have subscribed to the automatic cartridge delivery service that the ink in the cartridge is running low.

While the description has been made in detail with reference to specific embodiment, it would be apparent to those skilled in the art that various changes and modifications may be made therein. More specifically, when the connection status in the embodiment described above is "unstable" and arrangements have not been made to deliver cartridges, the printer 10 displays the tenth screen on the display 16 on condition that the residual ink quantity is 20% or less. However, the printer 10 may display the tenth screen on the display 16 on condition that the residual ink quantity is 30% or less. That is, when the connection status is "unstable" and arrangements are not made for cartridge delivery, the printer 10 may display a message indicating that ink is low at the same timing that the printer 10 displays the same message to users not subscribed to the automatic cartridge delivery service.

Further, when the connection status in the embodiment described above is "stable," the printer 10 displays either the third screen 80 or the fifth screen on the display 16 when the residual ink quantity is 5% or less, and displays either the fourth screen or the sixth screen on the display 16 when the residual ink quantity is 0%, but the printer 10 may be configured to display only the fourth screen or sixth screen on the display 16 when the residual ink quantity is 0%. In other words, when the residual ink quantity is greater than 0% and less than or equal to 5%, the printer 10 does not display a screen notifying the user that ink is low.

In the above embodiment, the printer 10 stores "subscribed" in the data storage area 32 as the agreement status when special cartridges are connected to the connector 21 after the printer 10 has received service-initiating information. However, the printer 10 may store "subscribed" in the data storage area 32 merely in response to receiving the service-initiating information.

In the embodiment described above, the information management server 50 transmits shipping information to the printer 10 when the delivery management server 70 has arranged for cartridge delivery, but the information management server 50 may transmit the shipping information when the cartridges have actually been shipped off to the user or when the cartridges have actually reached the user, for example.

Further, the connection statuses "no communication" and "disconnected" are treated differently in the above embodiment. However, both statuses share the points that printing information cannot be transmitted to the information management server 50 and that a response cannot be received from the information management server 50. Therefore, these statuses do not particularly need to be differentiated from each other. That is, the printer 10 may execute either the no-communication display subroutine or disconnected display subroutine regardless of whether the connection status is the status determined to be "no communication" in the embodiment or the status determined to be "disconnected" in the embodiment.

In the embodiment described above, the information management server 50 directly receives printing information from the printer 10 connected to a network, but the information management server 50 may instead receive printing information indirectly via a PC or the like. For example, the printer 10 may be connected to a PC via a USB cable, a wired or wireless local area network, or the like, and the PC may transmit printing information on the printer 10 to the information management server 50.

In the embodiment described above, the information management server 50 is configured of a single web server, but the information management server 50 may instead be configured of a plurality of web servers.

In the embodiment described above, the information management server 50 and the delivery management server 70 are configured of independent web servers, but the information management server 50 and the delivery management server 70 may be configured of a single web server.

While the above embodiment describes a case in which the CPU 12 or the CPU 52 executes the processes shown in FIGS. 5 through 10, these processes may be implemented by an ASIC or other logic integrated circuit rather than the CPU 12 or the CPU 52, or may be executed by a combination of CPUs, ASICs, and other logic integrated circuits.

What is claimed is:

1. An image forming apparatus comprising:
   a connector to which a cartridge containing printing material is connectable;
   a printing device configured to print an image using the printing material contained in the cartridge connected to the connector;
   a communication interface;
   a storage; and
   a controller configured to:
      in response to receiving subscribed information from a server via the communication interface, store in the storage a first status as a subscription status, the subscription status indicating whether a user of the image forming apparatus is subscribed to a specific service, the subscribed information and the first status indicating that the user is subscribed to the specific service, the subscribed information being transmitted from the server after the user subscribes to the specific service;
      acquire first information indicating a residual quantity of the printing material in the cartridge connected to the connector;

in response to the first status being stored in the storage, transmit the first information to the server via the communication interface, a new cartridge being delivered to the user in response to transmitting the first information to the server when the user is subscribed to the specific service;

determine whether the residual quantity is less than or equal to a threshold value; and in response to the residual quantity being determined to be less than or equal to the threshold value, notify the user that the residual quantity is running low, wherein a first threshold value is used as the threshold value when the first status is not stored in the storage, whereas a second threshold is used as the threshold value when the first status is stored in the storage, the second threshold value being less than the first threshold value.

2. The image forming apparatus according to claim 1, wherein the controller is further configured to:

receive second information including one of the subscribed information and non-subscribed information from the server via the communication interface, the non-subscribed information indicating that the user is not subscribed to the specific service; and when the received second information includes the non-subscribed information, store a second status as the subscription status in the storage, the second status indicating that the user is not subscribed to the specific service.

3. The image forming apparatus according to claim 1, wherein the controller is further configured to:

receive third information via the communication interface, the third information indicating that a delivery of the new cartridge to the user has been arranged;

detect replacement of the cartridge currently connected to the connector with the new cartridge, notify the user that the residual quantity is running low when the third information is not received after the last replacement and when the residual quantity is less than or equal to a third threshold value that is greater than the second threshold value; and notify the user that the residual quantity is running low when the third information is received after the last replacement and when the residual quantity is less than or equal to the second threshold value.

4. The image forming apparatus according to claim 3, wherein the third threshold value differs from the first threshold value.

5. The image forming apparatus according to claim 1, wherein the controller is further configured to:

in response to the first status being stored in the storage, transmit the first information to the server at a prescribed timing via the communication interface; and in response to a failure of the transmission of the first information, notify the user of fourth information prompting the user to establish a communication with the server via the communication interface.

6. The image forming apparatus according to claim 5, wherein the controller is further configured to:

calculate a probability of the failure of the transmission of the first information; and modify contents of the fourth information in accordance with the calculated probability.

7. The image forming apparatus according to claim 5, wherein the controller is further configured to:

calculate a probability of the failure of the transmission of the first information; and in response to the calculated probability being greater than or equal to a prescribed value, notify the user of fourth information.

8. The image forming apparatus according to claim 7, wherein the controller is further configured to notify the user of fifth information together with the fourth information in response to the calculated probability being 100%, the fifth information indicating a reason for the failure of the transmission of the first information.

9. The image forming apparatus according to claim 5, wherein the server is configured to:

receive the first information transmitted from the image forming apparatus a plurality of times;

attempt to estimate a delivery timing at which the new cartridge is delivered to the user on the basis of a plurality of sets of the received first information; and transmit sixth information when estimating the delivery timing is impossible caused by a lack of the number of times of receiving the first information, the sixth information indicating that the communication with the image forming apparatus is unstable, and wherein the controller is further configured to:

receive the sixth information via the communication interface; and in response to receiving the sixth information, notify the user of the fourth information regardless of the failure of the transmission of the first information.

10. The image forming apparatus according to claim 1, wherein the controller is further configured to receive service-initiating information as the subscribed information from the server via the communication interface, the service-initiating information being for beginning the specific service.

11. The image forming apparatus according to claim 10, wherein, when the server receives a request to enter into an agreement for the specific service via the Internet, the subscribed information is transmitted from the server.

12. The image forming apparatus according to claim 10, wherein one of a first cartridge and a second cartridge different from the first cartridge is selectively connected to the connector, the first cartridge being used exclusively for the specific service, wherein the controller is further configured to determine whether the first cartridge is connected to the connector, and wherein the first status is stored as the subscription status in the storage after the first cartridge is determined to be connected to the connector.

13. The image forming apparatus according to claim 12, wherein an operating mode of the image forming apparatus is configured to be changed from a first mode to a second mode, a specific printing process in which the first cartridge is used being prohibited in the first mode, the specific printing process being allowed in the second mode, and wherein the operating mode is changed from the first mode to the second mode in response to receiving the subscribed information.

14. The image forming apparatus according to claim 13, wherein the controller is further configured to:

receive service-terminating information from the server via the communication interface, the service-terminating information being for terminating the specific service; and in response to receiving the service-terminating information, store a second status as the subscription status in the storage, the second status indicating that the user is not subscribed to the specific service.

15. The image forming apparatus according to claim 1, wherein one of a first cartridge and a second cartridge different from the first cartridge is selectively connected to the connector, the first cartridge being used exclusively for the specific service, and wherein number of pages printed in a state where the first cartridge is connected to the connector is counted as pages printed in the specific service, whereas number of pages printed in a state where the second cartridge is connected to the connector is not counted as pages printed in the specific service.

16. The image forming apparatus according to claim 1, wherein the printing device includes an inkjet head configured to eject ink as the printing material to print the image.

17. The image forming apparatus according to claim 1, wherein the printing device is an electrophotographic system configured to print the image using toner as the printing material.

18. A non-transitory computer readable storage medium storing a set of program instructions for an image forming apparatus, the image forming apparatus comprising:
- a connector to which a cartridge containing printing material is connectable;
- a printing device configured to print an image using the printing material contained in the cartridge connected to the connector;
- a communication interface;
- a storage; and
- a controller, the set of program instructions, when executed by the controller, causing the image forming apparatus to perform:

in response to receiving subscribed information from a server via the communication interface, storing in the storage a specific status as a subscription status, the subscription status indicating whether a user of the image forming apparatus is subscribed to the specific service, the subscribed information and the specific status indicating that the user is subscribed to the specific service;

acquiring specific information indicating a residual quantity of the printing material in the cartridge connected to the connector;

in response to the specific status being stored in the storage, transmitting the specific information to the server via the communication interface, a new cartridge being delivered to the user in response to transmitting the specific information to the server when the user is subscribed to the specific service;

determine whether the residual quantity is less than or equal to a threshold value; and in response to the residual quantity being determined to be less than or equal to the threshold value, notify the user that the residual quantity is running low, wherein a first threshold value is used as the threshold value when the specific status is not stored in the storage, whereas a second threshold is used as the threshold value when the specific status is stored in the storage, the second threshold value being less than the first threshold value.

* * * * *